B. F. & J. A. SCOTT.
WEED ERADICATING MACHINE.
APPLICATION FILED JULY 13, 1909.

943,475.

Patented Dec. 14, 1909.

WITNESSES

INVENTORS
Benjamin F. Scott
John A. Scott
BY

ATTORNEYS

UNITED STATES PATENT OFFICE.

BENJAMIN FRANKLIN SCOTT AND JOHN ANDREW SCOTT, OF JASPER, MINNESOTA.

WEED-ERADICATING MACHINE.

943,475.

Specification of Letters Patent.

Patented Dec. 14, 1909.

Application filed July 13, 1909. Serial No. 507,333.

*To all whom it may concern:*

Be it known that we, BENJAMIN F. SCOTT and JOHN A. SCOTT, citizens of the United States, and both residents of Jasper, in the county of Pipestone and State of Minnesota, have invented a new and Improved Weed-Eradicating Machine, of which the following is a full, clear, and exact description.

Among the principal objects which this invention has in view are: to provide a machine which will extract from the ground weeds, roots, rubbish and other foreign material which it is found desirable to remove; to provide a structure wherein the said roots, rubbish and similar material are delivered into a receptacle by means of which it is carted from the field; to provide a structure which is resilient, thereby avoiding breakage of the machine parts; and to provide a machine which is simple and inexpensive in structure and efficient in operation.

One embodiment of the present invention is disclosed in the structure illustrated in the accompanying drawings, in which like characters of reference denote corresponding parts in both views, and in which—

Figure 1:
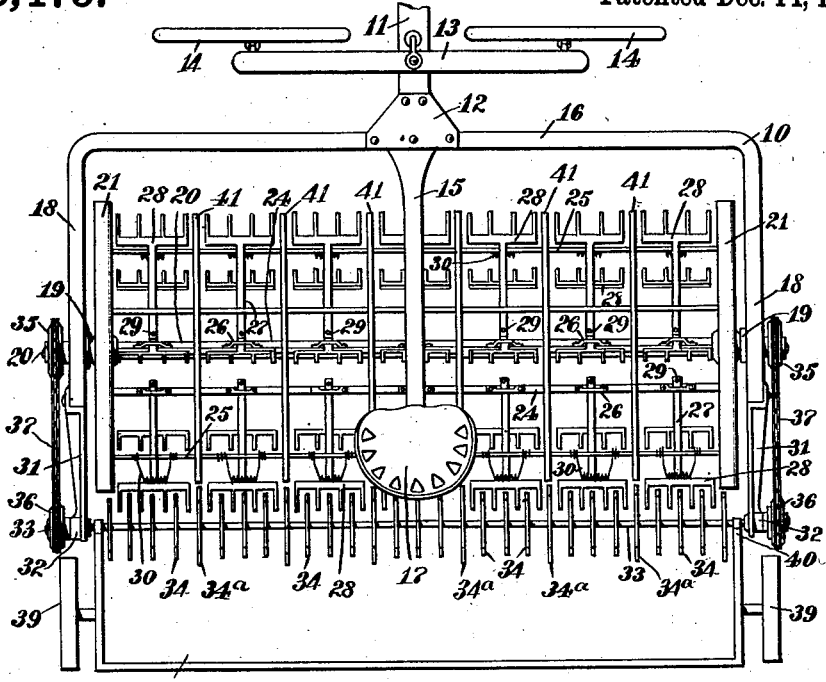
Figure 2:
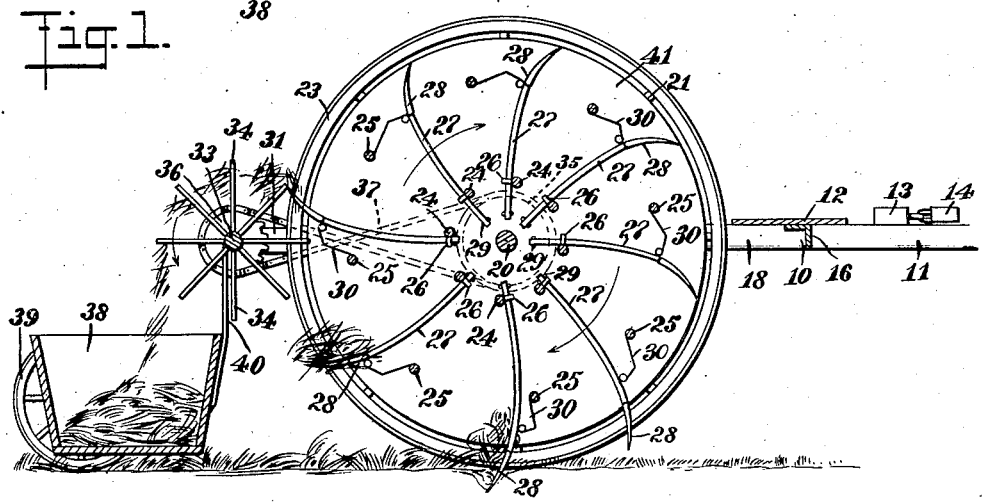

Figure 1 is a plan view of an eradicator, constructed in conformity with this invention; and Fig. 2 is a longitudinal vertical section of the same.

The particular construction illustrated in the drawings embodies a frame 10 which is provided with suitable bearings 19 in which is journaled an axle 20. The axle 20 is suitably mounted in the journals 19, and is fixedly attached to one of the wheels 21, running free in the other wheel. This mounting is intended to provide for the unequal movement of the wheels when turning corners or when running over uneven ground. The wheels 21 are provided with any suitable form of fellies 23. The frame 10 is yoke-shaped, as shown at Fig. 1 of the drawings, and is rigidly secured by means of an angle plate 12 to a suitable draft tongue 11. Upon the draft tongue 11 is mounted a double tree 13 carrying swingle trees 14, 14.

It will be noticed that we do not intend to limit ourselves to any particular form of structure to accommodate the draft convenience. In other words, a double or a single team may be employed.

The axle 20 is suitably extended beyond the journals 19, 19 and the frame side arms 18, 18, and is suitably provided with sprocket whels 35, 35, the same being fixedly mounted upon the ends of the axle 20. This construction is provided as a driving mechanism whereby the shaft 33 may be rotated. The shaft 33 is extended crosswise of the machine, and is mounted in suitable bearings 32, 32 provided in the ends of bracket arms 31, 31 which are extended rearward from the machine, being bolted rigidly to the ends of the side arms 18, 18. Upon each end of the shaft 33, and in line with the sprockets 35, are fixedly mounted sprockets 36, 36. The sprockets 36 are of smaller diameter than the sprockets 35 to produce a much more rapid rotation of the shaft 33 than is given by the axle 20. The sprockets 35, 35 and 36, 36 on both sides of the machine are connected by sprocket chains 37, 37. These chains 37, 37 are twisted to produce in the shaft 33 a rotary direction opposite that produced on the axle 20. It is from the shaft 33 that there is suspended the arms 40, 40 attached to the box-like receptacle 38. The receptacle 38 is suitably mounted upon free running supporting wheels 39, 39. The purpose of the receptacle 38 is to receive the roots, weeds and rubbish when the same are delivered thereto.

The eradicating mechanism comprises a series of forks extended radially about the axle 20 and beyond the periphery of the wheels 21. These forks are loosely mounted upon connecting rods 24, 24 which are extended lengthwise of the machine and parallel of the axle thereof and between the circular plates 41, 41. The plates 41, 41 are fixedly secured upon the axle 20 and to the rods 24, 24, and also to the rods 25, 25, which, like the rods, 24, 24, are extended across the machine in parallel arrangement with the axle 20.

Between each of the plates 41 are mounted a series of forks having hafts 27, 27 and heads 28, 28 provided with a series of tines. The hafts 27, 27 are slidably mounted in guide loops 26, 26 set out from and fixedly secured upon the rods 24, 24. In operation, the fork, by its own weight, throws outward from the axle 20, sliding in the loops 26 until arrested by the pins 29, 29 with which each of the hafts is provided. When the pin 29 on each haft rests in engagement with the loop 26 on each rod, the tines of the head 28 will extend beyond the periphery of the wheels 21 at the designed distance. The extension of the tines regulates the depth of the dig of the fork. This extension of the fork occurs when the rod 24 upon which it is mounted passes to a position where the weight of the fork throws the same to the extended position described.

In the operation of the forks described they are extended to the operating position by gravity. When in the extended position they strike upon the ground and rest upon the same until the rods 25, 25 impinge upon the tops of the hafts of the said forks. Gradually, by means of the rods 25, the weight of the machine is imposed upon the fork tines, causing the same to be buried within the ground. Also, by reason of the extension of the tines beyond the periphery of the wheel, a certain amount of movement through the ground is imposed by the difference between the speed of the periphery of the wheel and the ends of the said tines. This action gives a breaking movement of the tines while extended below the surface of the ground, thereby gathering to themselves any stringyroot, quack grass or rubbish. In the continued rotation of the wheel the rods 25 continue to bear against the haft 27, raising the tines from engagement with the ground by the further rotation of the wheels 21, compelling the same to lift and carry their load until the same is extracted therefrom.

It will be noticed that the connection of the forks with the rods 24 being a sliding connection the same is permitted to yield in the event of striking a substance too hard or tough for the insertion of the said tines. In such an event instead of the weight of the machine bearing upon the ends of the tines and thereby rendering them liable to breakage, the fork will recede within the loop 26 set out from the rods 24, 24.

Connecting the heads 28, 28 and the rods 25, 25 are a series of springs 30, 30. These springs have the dual purpose of maintaining a proper alinement of the heads between the plates 41, 41, and to assist and permit the extension of the forks when in position to be extended by gravity. These springs are of any desired construction. In the lifting action of the forks the plates 41, 41 guide the material being handled, and in part maintain the same upon the forks. The plates 41, 41 also materially strengthen the construction.

Extended radially from the shaft 33 are a series of arms 34, 34. The number of arms is regulated to suit. Each series is adapted to extend between the tines of the heads 28 and adapted to extract whatever material is carried by the said tines. Between each one of adjacent forks a second series of arms 34ª, 34ª are extended, reaching close to the periphery of the plates 41, 41. The second mentioned series of arms are provided to raise from engagement any material being carried by the adjacent forks. All of said arms, 34 and 34ª, are fixedly mounted upon the shaft 33. The shaft 33, as above described, is driven by the chain 37 in the direction opposite the travel of the wheels 21. As also stated, the shaft 33 is driven at a much higher rate of rotation than that imparted to the axle 20. By reason of this construction and arrangement whatever material is carried by the forks as they pass within the path of the arms 34 and 34ª, these arms traveling at a greater rate of speed than the said forks, extract from the said forks any material carried thereby. By reason of the direction imparted to the arms 34 the material thus extracted from the forks is carried backward and deposited within the receptacle 38.

By reason of the action thus described it will be observed that the machine has operated to uproot all running weeds, such as quack grass, stringy root, and also rubbish not desired in the soil, and has delivered the same to the receptacle, whereby it is removed from the field, but not as in the operation of plowing and harrowing, leaving the same upon the surface of the ground to be exposed to the action of the sun. With roots of the character specified, if thus left on the surface of the ground, they will take root and thrive.

Suitably secured upon the front bar 16 of the frame 10 is a seat bar 15, upon which is mounted a seat 17.

Having thus described our invention, what we claim as new and desire to secure by Letters Patent is:

1. A weed eradicating machine, comprising a plurality of forks slidably mounted in a rotary frame, a yielding member adapted to extend the said forks upon the periphery of the carrying wheels for said frame, a plurality of rods fixedly mounted in said frame adapted to impinge upon said forks when the same are in contact with the earth to bury the tines thereof within the said earth, and rotary means for extracting the material carried by the tines of said forks therefrom to deliver the same away from said forks.

2. A weed eradicating machine, comprising a plurality of forks slidably mounted in a rotary frame, a yielding member adapted to extend the said forks upon the periphery of the carrying wheels for said frame, a plurality of rods fixedly mounted in said frame adapted to impinge upon said forks when the same are in contact with the earth to bury the tines thereof within the said earth, rotary means for extracting the material carried by the tines of said forks therefrom to deliver the same away from said forks, and a receptacle mounted on carrying wheels and connected with said machine to receive the material when extracted from the said forks.

3. A weed eradicating machine, comprising a plurality of forks slidably mounted in a rotary frame, a yielding member adapted to extend the said forks upon the periphery of the carrying wheels for said frame, a plurality of rods fixedly mounted in said frame adapted to impinge upon said forks when the same are in contact with the earth to bury the tines thereof within the said earth, a shaft transversely mounted on said machine and having a plurality of arms adapted to extend between the tines of said forks and a driving connection with the axle of the carrying wheels of said frame, and a receptacle mounted on carrying wheels and connected with said machine to receive the material from the said arms when extracted from the said forks.

In testimony whereof we have signed our names to this specification in the presence of two subscribing witnesses.

BENJAMIN FRANKLIN SCOTT.
JOHN ANDREW SCOTT.

Witnesses:
G. S. SMILEY,
T. H. TAYLOR.